US008326065B2

(12) United States Patent
Kim

(10) Patent No.: US 8,326,065 B2
(45) Date of Patent: Dec. 4, 2012

(54) METHOD AND APPARATUS FOR ENCODING IMAGE DATA INCLUDING GENERATION OF BIT STREAMS

(75) Inventor: Wooshik Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 33 days.

(21) Appl. No.: 12/926,687

(22) Filed: Dec. 3, 2010

(65) Prior Publication Data

US 2011/0081078 A1 Apr. 7, 2011

(51) Int. Cl.
*G06K 9/36* (2006.01)
*G06K 9/46* (2006.01)

(52) U.S. Cl. ...................................... 382/240

(58) Field of Classification Search .................. 382/164, 382/166, 170, 173, 224, 225, 238, 240, 253, 382/272; 345/589, 719, 722, 723; 358/3.19, 358/453; 348/417; 375/240.13, 240.24
See application file for complete search history.

(56) References Cited

U.S. PATENT DOCUMENTS

| | | | |
|---|---|---|---|
| 4,581,638 A | 4/1986 | Chiariglione | |
| 4,751,742 A | 6/1988 | Meeker | |
| 4,920,501 A * | 4/1990 | Sullivan et al. | 358/3.19 |
| 4,937,681 A | 6/1990 | Fujinawa et al. | |
| 4,954,892 A | 9/1990 | Asai et al. | |
| 5,122,873 A | 6/1992 | Golin | |
| 5,412,741 A | 5/1995 | Shapiro | |
| 5,414,527 A | 5/1995 | Koshi et al. | |
| 5,465,164 A | 11/1995 | Sugiura | |
| 5,513,128 A | 4/1996 | Rao | |
| 5,570,132 A | 10/1996 | De With et al. | |
| 5,627,917 A | 5/1997 | Chen | |
| 5,724,451 A * | 3/1998 | Shin et al. | 382/240 |
| 5,748,244 A | 5/1998 | Jung | |
| 5,748,245 A | 5/1998 | Shimizu et al. | |
| 5,761,342 A | 6/1998 | Yoshida | |
| 5,838,826 A | 11/1998 | Enari et al. | |
| 5,867,221 A * | 2/1999 | Pullen et al. | 375/240.16 |
| 5,974,184 A | 10/1999 | Eifrig et al. | |
| 6,021,224 A | 2/2000 | Castelli et al. | |
| 6,026,232 A | 2/2000 | Yogeshwar et al. | |
| 6,091,767 A | 7/2000 | Westerman | |
| 6,104,434 A | 8/2000 | Nakagawa et al. | |

(Continued)

FOREIGN PATENT DOCUMENTS

EP 0661886 A2 7/1995

(Continued)

OTHER PUBLICATIONS

Definition of "Residue"—Merriam Webster Online and Google Search.

(Continued)

*Primary Examiner* — Amir Alavi
(74) *Attorney, Agent, or Firm* — Staas & Halsey LLP

(57) ABSTRACT

A method of encoding image data, and an apparatus to perform the method, the method including repeating a process of dividing a block into sub-blocks based on an average value of pixels of the sub-blocks; creating map information of the sub-blocks; determining a mode for generating bit streams according to a number of the sub-blocks; and generating bit streams of the determined mode, map information, and representative pixel values of the block or the sub-blocks.

27 Claims, 10 Drawing Sheets

U.S. PATENT DOCUMENTS

| | | | |
|---|---|---|---|
| 6,122,318 | A | 9/2000 | Yamaguchi et al. |
| 6,141,445 | A | 10/2000 | Castelli et al. |
| 6,222,884 | B1 | 4/2001 | Mitchell et al. |
| 6,351,492 | B1 | 2/2002 | Kim |
| 6,549,670 | B1 | 4/2003 | Sato et al. |
| 6,574,276 | B2* | 6/2003 | Cougnard et al. ....... 375/240.12 |
| 6,611,620 | B1 | 8/2003 | Kobayashi et al. |
| 6,614,942 | B1 | 9/2003 | Meier |
| 6,728,317 | B1 | 4/2004 | Demos |
| 6,735,567 | B2 | 5/2004 | Gao et al. |
| 6,865,297 | B2* | 3/2005 | Loui et al. ................. 382/224 |
| 6,909,804 | B2 | 6/2005 | Caruso et al. |
| 6,972,868 | B1 | 12/2005 | Gondek et al. |
| 6,973,130 | B1 | 12/2005 | Wee et al. |
| 7,106,910 | B2 | 9/2006 | Acharya et al. |
| 7,295,704 | B2 | 11/2007 | Caruso et al. |
| 7,333,544 | B2 | 2/2008 | Kim et al. |
| 7,526,124 | B2 | 4/2009 | Dwyer et al. |
| 7,535,961 | B2 | 5/2009 | Cho et al. |
| 7,747,096 | B2 | 6/2010 | Birinov et al. |
| 7,778,459 | B2 | 8/2010 | Song |
| 7,865,027 | B2* | 1/2011 | Kim ........................... 382/240 |
| 2001/0019630 | A1 | 9/2001 | Johnson |
| 2003/0031369 | A1 | 2/2003 | Le Pennec et al. |
| 2003/0035478 | A1 | 2/2003 | Taubman |
| 2003/0113026 | A1 | 6/2003 | Srinivasan et al. |
| 2004/0032988 | A1 | 2/2004 | Wu et al. |
| 2004/0233990 | A1 | 11/2004 | Sekiguchi et al. |
| 2004/0236604 | A1 | 11/2004 | McNair |
| 2005/0013369 | A1 | 1/2005 | Lee |
| 2005/0111741 | A1 | 5/2005 | Kim et al. |
| 2005/0141617 | A1 | 6/2005 | Kim et al. |
| 2006/0033838 | A1 | 2/2006 | Choi |
| 2006/0098879 | A1 | 5/2006 | Kim et al. |
| 2006/0098881 | A1 | 5/2006 | Kim |
| 2006/0098884 | A1 | 5/2006 | Kim |
| 2006/0126727 | A1 | 6/2006 | Kim et al. |
| 2006/0126962 | A1 | 6/2006 | Sun |
| 2006/0139287 | A1 | 6/2006 | Kim et al. |
| 2006/0146930 | A1 | 7/2006 | Kim et al. |
| 2006/0193527 | A1* | 8/2006 | Kalva et al. ................ 382/239 |
| 2006/0233251 | A1 | 10/2006 | Kim et al. |
| 2007/0014481 | A1 | 1/2007 | Kim et al. |
| 2007/0025626 | A1 | 2/2007 | Birinov et al. |
| 2007/0025631 | A1 | 2/2007 | Kim et al. |
| 2007/0047648 | A1* | 3/2007 | Tourapis et al. .......... 375/240.13 |
| 2007/0110153 | A1 | 5/2007 | Cho et al. |
| 2007/0154087 | A1 | 7/2007 | Cho et al. |
| 2007/0171490 | A1 | 7/2007 | Cho et al. |
| 2011/0081078 | A1* | 4/2011 | Kim ........................... 382/166 |

FOREIGN PATENT DOCUMENTS

| | | |
|---|---|---|
| EP | 0661886 A3 | 7/1996 |
| EP | 0750427 A2 | 12/1996 |
| EP | 1 014 699 | 6/2000 |
| EP | 0750427 A3 | 7/2000 |
| GB | 2 371 162 | 7/2002 |
| JP | 2000-078411 | 3/2000 |
| KR | 10-0178221 | 11/1998 |
| KR | 10-0202493 | 6/1999 |

OTHER PUBLICATIONS

Domanski, et al., "Lossless and Near Lossless Image Compression with Color Transformations", pp. 454-457.

Google Search—"Fractal Coding Color Images Using Correlation", pp. 1-3; Google Search—"Lossless Near Lossless Image Compression", pp. 1-2; Google Search—"YCoCg-R: Color Space Reversibility", pp. 1-2.

Hurtgen et al. Fractal Transform Coding of Color Images, pp. 1-9, (1683-1691).

Zhang et al. Fractal Color Image Compression Using Vector Distortion Measure, pp. 1-4 (1995) (276-279).

E. Meyer et al. (An intrafield DCT-CODEC for consumer application) Robert Bosch GmbH, Federal Republic of Germany, pp. 553-557 (in English).

Palau et al. (Image coding with discrete cosine transforms using efficient energy-based adaptive zonal filtering) 1994, pp. 337-340 (in English).

S. Lee et al. (ASIC implementation of a new and efficient wavelet coding algorithm) Yongin 229-232 (in English).

MPEG Video Compression Standard XP-002366637, pp. 94-100, pp. 151-162, pp. 225-227 (in English).

Ramachandran et al. (A fast, FPGA-based MPEG-2 video encoder with a novel automatic quality control scheme) Microprocessors and Microsystems 25 (2002) 449-457 (in English).

Li (Computation reduction for standard-based video encoders based on the energy preservation property of DCT) Signal Processing: Image Communication 19 (2004) 457-464 (in English).

Kobayashi, et al., "Lossless Compression for RGB Color Still Images", Proceedings of the 1999 International Conference on Image Processing (ICIP 99), Oct. 24-28, 1999, pp. 73-77, vol. 4, XP-010368688.

Kobayashi et al., "High Speed Lossless Compression Method for Color Still Images", Journal of the Institute of Image Electronics Engineers of Japan Gazo Denshi Gakkai, Japan, Sep. 2002, pp. 778-786, vol. 31, No. 5, XP-008058538.

Nakane et al., "Fractal Coding of Color Images Using the Correlation Between Y and C Components", Visual Communications and Image Processing, Jul. 2003, pp. 2043-2051, vol. 5150, No. 1, XP-002363381, SPIE—The International Society for Optical Engineering, USA.

Wiegand, et al., "Overview of the H.264/AVC Video Coding Standard", IEEE Transactions on Circuits and Systems for Video Technology, Jul. 2003, pp. 560-576, vol. 13, No. 7, XP-001169882.

Malvar et al., "YCoCg-R: A Color Space with RGB Reversibility and Low Dynamic Range", Joint Video Team (JVT) of ISO/IEC MPEG & ITU-T VCEG (ISO/IEC JTC1/SC29/WG11 and ITU-T SG16 Q.6, Jul. 22-24, 2003, pp. 1-5, No. JVT-1014r3, XP-002363382.

P.H.N. DeWith, "Motion-Adaptive Intraframe Transform Coding of Video Signals", Philips Journal of Research, Jul. 28, 1989, pp. 345-364, vol. 44, Nos. 2-3, XP-000053343.

Wolberg et al. "A Review of the Fractal Image Coding Literature" IEEE Transactions on image Processing, Vo. 8, No. 12, Dec. 1999, pp. 1716-1729.

Hui, "An Adaptive Truncation Coding Algorithm for Image Compression", Apr. 3, 1990, pp. 2233-2236, (XP010641631), 1990 IEEE.

Cheng et al., "Image Compression Using Adaptive Multilevel Block Truncation Coding", Sep. 1993, pp. 225-241, vol. 4, No. 3, (XP000986750), Journal of Visual Communication and Image Representation.

Thomas Wiegand, et al., "Draft Text of Final Draft International Standard (FDIS) of Joint Video Specification (ITU-T Rec./ ISO/IEC 14496-10 AVC)", Text of the Joint Video Team (JVT) of ISO/IEC MPEG & ITU-T VCEG, 7$^{th}$ Meeting, Pattaya, Thailand, Mar. 7-14, 2003 (264 pgs).

"Zerotree Pattern Coding of Motion Picture Residues for Error Resilient Transmission of Video Sequences" IEEE Journal on Selected Areas in Communications, vol. 18, No. 6, Jun. 2000, pp. 1-12.

U.S. Appl. No. 10/996,448, filed Nov. 26, 2004, Kim et al., Samsung Electronics Co., Ltd.

U.S. Appl. No. 11/268,646, filed Nov. 8, 2005, Kim, Samsung Electronics Co., Ltd.

U.S. Appl. No. 11/268,645, filed Nov. 8, 2005, Kim, Samsung Electronics Co., Ltd.

European Search Report for European Patent Application No. EP05256866.4 dated Mar. 10, 2006.

European Search Report for European Patent Application No. EP05256866.4 dated Jun. 23, 2006.

European Search Report dated Apr. 13, 2006 for European Patent Application No. 04257277.6.

Notice of Allowance mailed on Feb. 12, 2010 in related U.S. Appl. No. 10/996,448.

US Office Action mailed on Sep. 2, 2009 in related U.S. Appl. No. 10/996,448.

US Advisory Action mailed on May 20, 2009 in related U.S. Appl. No. 10/996,448.

US Office Action mailed on Feb. 20, 2009 in related U.S. Appl. No. 10/996,448.

US Office Action mailed on Aug. 25, 2008 in related U.S. Appl. No. 10/996,448.
Office Action mailed Oct. 6, 2010 in copending U.S. Appl. No. 10/996,448.
European Search Report European Patent Application No. EP05256865.6 dated Feb. 16, 2006.
Japanese Office Action dated Jul. 20, 2010 in Japanese Application No. 2004-342873.
Korean Patent Application No. 10-0202493—Search Notes/History, Jun. 15, 1999.
Korean Office Action dated Apr. 24, 2006 issued in Korean Application No. 10-2004-0090893.

US. Office Action dated Mar. 5, 2009 issued in copending U.S. Appl. No. 11/268,646.
US. Office Action dated Mar. 16, 2009 issued in copending U.S. Appl. No. 11/268,645.
US. Notice of Allowance dated Dec. 11, 2009 issued in copending U.S. Appl. No. 11/268,645.
US. Office Action dated Mar. 26, 2010 issued in copending U.S. Appl. No. 11/268,645.
US. Notice of Allowance dated Sep. 2, 2010 issued in copending U.S. Appl. No. 11/268,645.

* cited by examiner

FIG. 4A

| 1 | 2 | 10 | 14 |
|---|---|----|----|
| 2 | 20 | 20 | 42 |
| 4 | 5 | 6 | 40 |
| 2 | 4 | 4 | 16 |

FIG. 4B

| 1 | 2 | 10 | 14 |
|---|---|----|----|
| 2 | 20 | 20 | 42 |
| 4 | 5 | 6 | 40 |
| 2 | 4 | 4 | 16 |

FIG. 4C

| 1 | 2 | 10 | |
|---|---|----|---|
| 2 | | | |
| 4 | 5 | 6 | |
| 2 | 4 | 4 | |

FIG. 4D

|   |   |   | 14 |
|---|---|---|----|
|   | 20| 20| 42 |
|   |   |   | 40 |
|   |   |   | 16 |

FIG. 4E

|   |   |   | 14 |
|---|---|---|----|
|   | 20 | 20 |   |
|   |   |   |   |
|   |   |   | 16 |

FIG. 4F

|   |   |   |    |
|---|---|---|----|
|   |   |   | 42 |
|   |   |   | 40 |
|   |   |   |    |

FIG. 5A

| 0 | 0 | 0 |   |
|---|---|---|---|
| 0 |   |   |   |
| 0 | 0 | 0 |   |
| 0 | 0 | 0 |   |

FIG. 5B

| 0 | 0 | 0 | 1 |
|---|---|---|---|
| 0 | 1 | 1 |   |
| 0 | 0 | 0 |   |
| 0 | 0 | 0 | 1 |

FIG. 5C

| $0_{(1)}$ | $0_{(2)}$ | $0_{(3)}$ | $1_{(4)}$ |
|---|---|---|---|
| $0_{(5)}$ | $1_{(6)}$ | $1_{(7)}$ | $2_{(8)}$ |
| $0_{(9)}$ | $0_{(10)}$ | $0_{(11)}$ | $2_{(12)}$ |
| $0_{(13)}$ | $0_{(14)}$ | $0_{(15)}$ | $1_{(16)}$ |

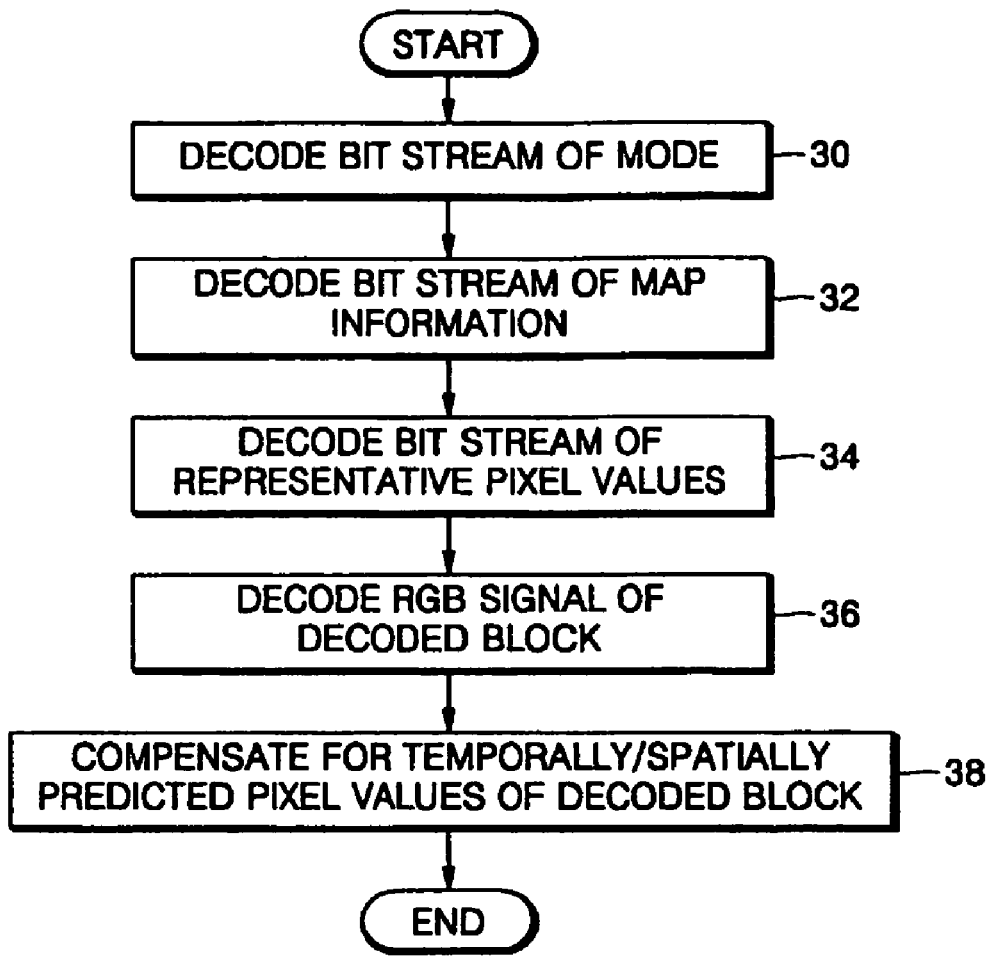

METHOD AND APPARATUS FOR ENCODING IMAGE DATA INCLUDING GENERATION OF BIT STREAMS

CROSS-REFERENCE TO RELATED APPLICATIONS

This application claims the benefit of U.S. patent application Ser. No. 11/268,645 filed on Nov. 8, 2005 now U.S. Pat No. 7,865,027 in the U.S. Patent and Trademark Office and Korean Patent Application No. 10-2004-0090893, filed on Nov. 9, 2004, in the Korean Intellectual Property Office, the disclosures of which is incorporated herein by reference.

BACKGROUND OF THE INVENTION

1. Field of the Invention

The present invention relates to image compression, and more particularly, to a method and apparatus for encoding and decoding image data.

2. Description of the Related Art

A color image is encoded after a color conversion is performed. For example, an R (Red), G (Green), and B (Blue) image is converted into a YCbCr image and separated into a luminance component and a chrominance component in order to encode the color image. This results in increasing an encoding efficiency since converting the RGB image into the YCbCr image removes redundant information between chrominance components. An integer transformation method using a lifting method, e.g., YCoCg-R by MICROSOFT®, has been developed in this regard.

Prediction encoding is performed for each of the chrominance components, i.e., RGB, of the color image. The redundant information among the RGB chrominance components is not used for the prediction encoding. Therefore, correlations among the RGB chrominance components are not used to encode each of the RGB chrominance components, thereby reducing the encoding efficiency.

The redundant information among the RGB chrominance components is removed using a temporal prediction (referred to as an Inter prediction) and a spatial prediction (referred to as an Intra prediction) in order to encode a converted image, thereby obtaining a residue image. According to H.264/MPEG-4 pt. 10 AVC standard technology ("Text of ISO/IEC FDIS 14496-10: Information Technology—Coding of audio-visual objects—Part 10: Advanced Video Coding", ISO/IEC JTC 1/SC 29/WG 11, N5555, March, 2003), which has been developed by the Joint Video Team (JVT) of the ISO/IEC MPEG and ITU-T VCEG groups, a variety of spatial and temporal prediction encoding methods are used to increase the encoding efficiency.

A quadtree dividing method used to encode a color image is illustrated in FIGS. 1A and 1B. FIG. 1A illustrates sub-blocks divided from divided blocks using the quadtree dividing method. FIG. 1B is a tree structure illustrating information of pixel values of divided sub-blocks. Referring to FIGS. 1A and 1B, the quadtree dividing method is used to divide a block to be encoded into four sub-blocks, and divide each of four sub-blocks into four sub-blocks, thereby encoding pixel values of sub-blocks as tree-structured information.

However, the conventional encoding method reduces a compression efficiency of the color image, while increasing the compression efficiency causes degradation of the color image.

SUMMARY OF THE INVENTION

The present invention provides a method of encoding and decoding image data that increases a compression efficiency of an image while not visibly degrading the image.

The present invention provides an apparatus to encode and decode image data that increases the compression efficiency of the image while not visibly degrading the image.

Additional aspects and/or advantages of the invention will be set forth in part in the description which follows and, in part, will be apparent from the description, or may be learned by practice of the invention.

According to an aspect of the present invention, there is provided a method of encoding image data, the method including: repeating a process of dividing a block into sub-blocks based on an average value of pixels of the sub-blocks; creating map information of the sub-blocks; determining a mode for generating bit streams according to a number of the sub-blocks; and generating bit streams of the determined mode, map information, and representative pixel values of the block or the sub-blocks.

According to an aspect of the present invention, there is provided a method of decoding image data, the method including: decoding a bit stream of a mode for generating bit streams according to a number of sub-blocks of a block; decoding bit streams of map information of the sub-blocks; and decoding bit streams of each representative pixel value of the block or sub-blocks.

According to another aspect of the present invention, there is provided an apparatus of encoding image data, the apparatus including: a sub-block encoding unit to repeat a process of dividing a block into sub-blocks based on an average value of pixels of the sub-blocks, create map information of the sub-blocks, and determine a mode for generating bit streams according to a number of the sub-blocks; and a bit stream generating unit to generate bit streams of the determined mode, map information, and representative pixel values of the block or sub-blocks.

According to another aspect of the present invention, there is provided an apparatus of decoding image data, the apparatus including: a mode decoding unit to decode a bit stream of a mode for generating bit streams according to a number of sub-blocks of a block; a map information decoding unit to decode bit streams of map information of the sub-blocks; and a representative pixel value decoding unit to decode bit streams of each representative pixel value of the block or sub-blocks.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A through 4F are diagrams illustrating sub-blocks divided from a 4×4 block;

FIGS. 5A through 5C are diagrams illustrating map information of sub-blocks;

FIG. 6 is a flow chart illustrating an image data decoding method according to an embodiment of the present invention;

FIG. 7 illustrates the block shown in FIG. 4A having bit streams decoded in Operations 30, 32, and 34 of FIG. 6;

DETAILED DESCRIPTION OF THE PREFERRED EMBODIMENTS

Figures 1A, 1B:
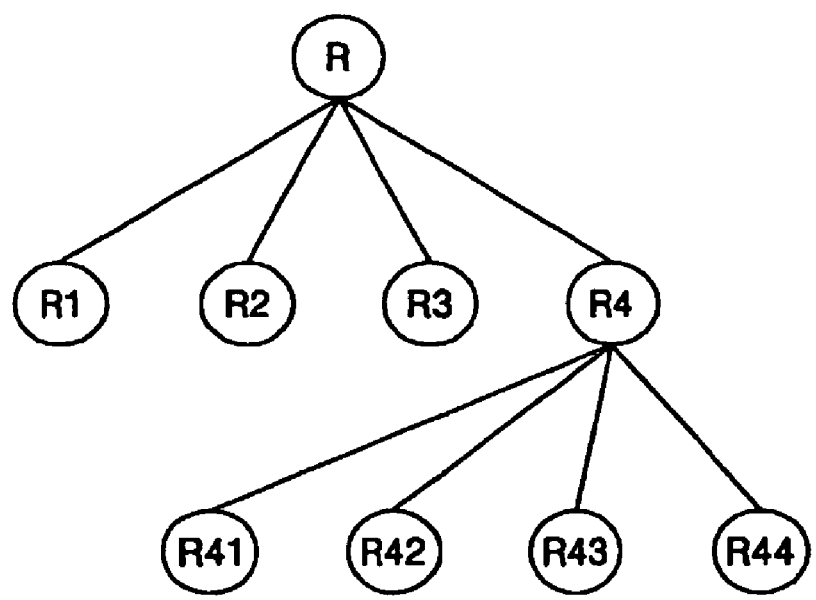
FIGS. 1A and 1B illustrate a conventional encoding method using the quadtree dividing method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
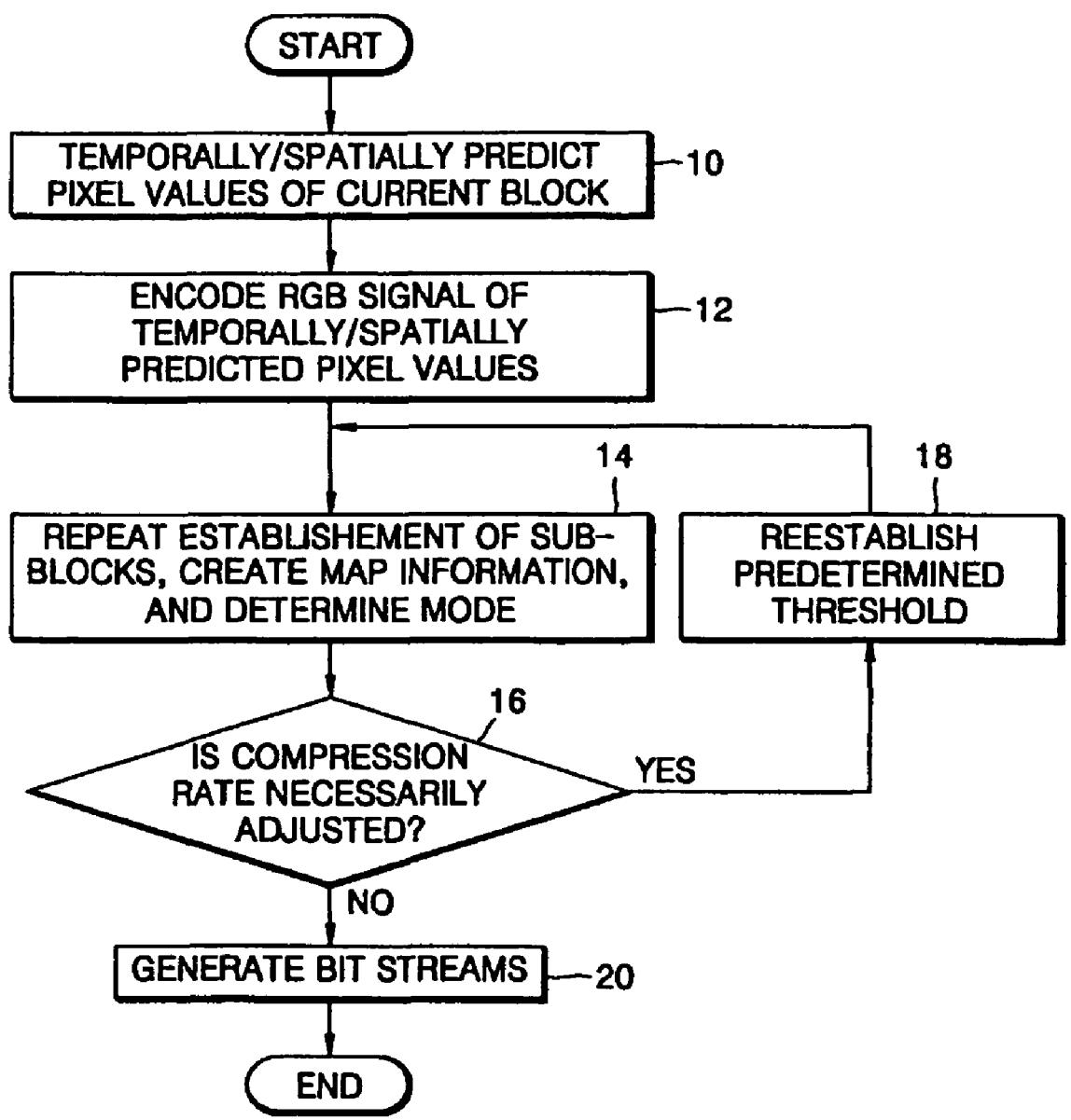
FIG. 2 is a flow chart illustrating an image data encoding method according to an embodiment of the present invention.

FIG. 2 is a flow chart illustrating an image data encoding method according to an embodiment of the present invention. Referring to FIG. 2, pixel values of a current block are spatially predicted using blocks spatially adjacent to the current block, or pixel values of the current block are temporally predicted using a previous of the current block (Operation 10). Spatially predicted pixel values are obtained by estimating a prediction direction from blocks spatially adjacent to the current block of each chrominance component. Temporally predicted pixel values are obtained by estimating motions between the current block and previous frames of each chrominance component.

Spatially or temporally predicted pixel values are residue values, which are hereinafter referred to as pixel values. A value obtained by averaging spatially or temporally predicted pixel values by sub-blocks is an average residue value, which is hereinafter referred to as an average pixel value.

A spatial and temporal prediction makes it possible to convert an RGB image into a YCbCr image, predict pixel values of a luminance component and a chrominance component, and directly predict a pixel value of each chrominance component, R, G, and B, of the RGB image.

Redundant information among the spatially and temporally predicted pixel values of each of the RGB chrominance components is removed, and an RGB signal is encoded (Operation 12). When pixel values of each of the RGB chrominance components of an RGB image are directly predicted in Operation 10, correlations among predicted pixel values of each of the RGB chrominance components are used to remove redundant information and encode the RGB signal having no redundant information, which is disclosed in U.S. patent application Ser. No. 10/996,448 entitled "A Color Image Residue Transform and/or Inverse Transform Method and Apparatus, and a Color Image Encoding and/or Decoding Method and Apparatus Using the Same".

A process of dividing blocks into two sub-blocks based on an average value of pixels of a block of the encoded RGB signal is repeated, map information of divided sub-blocks is created, and modes for generating bit streams are determined according to the number of divided sub-blocks (Operation 14).

Figure 3:
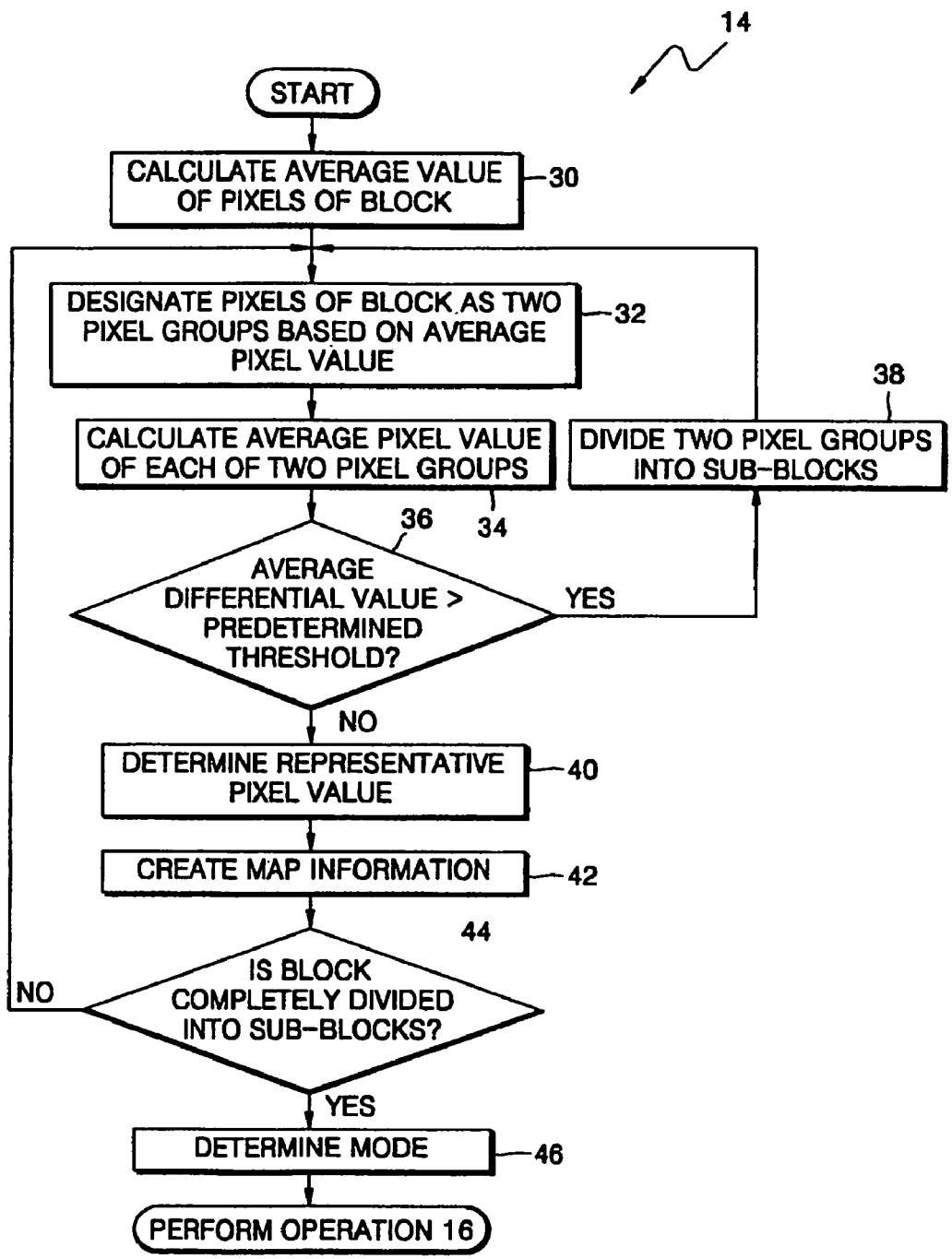
FIG. 3 is a flow chart illustrating Operation 14 of FIG. 2.

FIG. 3 is a flow chart illustrating Operation 14 of FIG. 2. Referring to FIG. 3, the average value of pixels of the block of the encoded RGB signal is calculated (Operation 30).

Figures 4D, 4E, 4F:
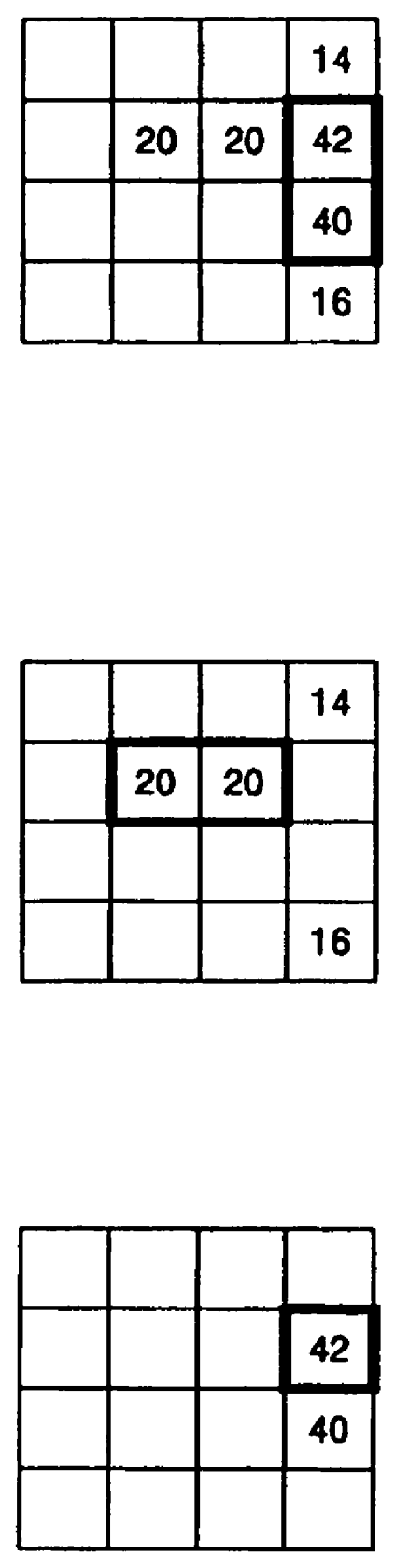

FIGS. 4A through 4F are diagrams illustrating sub-blocks divided from a 4×4 block. FIG. 4A is a diagram illustrating an embodiment of pixel values of the 4×4 block. The sum of pixel values of the 4×4 block is 192. The average value of pixels of the block of 4×4 is 12 when 192 is divided by 16, which corresponds to the number of pixels of the block of 4×4. The average pixel value should be an integer number. An average value that is not an integer number should be rounded off.

Pixels having pixel values more than the calculated average pixel value, or having the same pixel value as the calculated average pixel value, are designated as a pixel group, and pixels having pixel values less than the calculated average pixel value are designated as another pixel group (Operation 32).

FIG. 4B is a diagram illustrating pixels of the sub-divided 4×4 block that are separated into two pixel groups based on the calculated average pixel value. Referring to FIG. 4B, the pixels are separated into two pixel groups in which one pixel group includes pixels (in a bold line) having pixel values equal to or greater than 12, and another pixel group includes pixels having pixel values less than 12.

The average pixel value of each of two pixel groups is calculated (Operation 34).

The average pixel value of pixels having pixel values less than 12 is 40÷10=4, and the average pixel value of pixels having pixel values equal to or greater than 12 is 152÷6=25.33. The average pixel value should be an integer number. An average value that is not an integer number should be rounded off. The rounded off average pixel value of pixels having pixel values equal to or greater than 12 is 25.

It is determined whether an average differential value between average pixel values of two pixel groups is more than a predetermined threshold (Operation 36).

For example, when the average pixel value of pixels having pixel values less than 12 is 4, and the average pixel value of pixels having pixel values equal to or greater than 12 is 25, the average differential value is 25−4=21. When the predetermined threshold is 6, the average differential value of 21 is compared with the predetermined threshold of 6.

When the average differential value is more than the predetermined threshold, two pixel groups are designated as sub-blocks (Operation 38) and Operation 32 is performed on each of the sub-blocks. When the predetermined threshold is 6, and the average differential value is 21, since the average differential value is more than the predetermined threshold, the pixel group that includes pixels (in a bold line) having pixel values equal to or greater than 12 and the pixel group that includes pixels having pixel values less than 12 are designated as sub-blocks which will then be sub-divided according to their respective average pixel values.

Then, Operations 32, 34, and 36 are repeated.

In Operation 32, two sub-blocks are designated as two pixel groups based on average pixel values of the two sub-blocks.

FIG. 4C is a diagram illustrating a sub-block having pixel values less than 12 that is divided into two pixel groups based on an average pixel value of the sub-block. Referring to FIG. 4C, since the average pixel value of the sub-block having pixel values less than 12 is 4, pixels having pixel values equal to or greater than 4 are designated as one pixel group (in the bold line), and pixels having pixel values less than 4 are designated as another pixel group.

FIG. 4D is a diagram illustrating a sub-block having pixel values equal to or greater than 12 that is divided into two pixel groups based on a average pixel value of the sub-block. Referring to FIG. 4D, since the average pixel value of the sub-block having pixel values equal to or greater than 12 is 25, pixels having pixel values equal to or greater than 25 are designated as one pixel group (in the bold line), and pixels having pixel values less than 25 are designated as another pixel group.

Average pixel values of the four pixel groups are calculated (Operation 34).

Referring to FIG. 4C, the average pixel value of pixels having pixel values less than 4 is 7÷4=1.75, and the average pixel value of pixels having pixel values equal to or greater than 4 is 33÷6=5.5. By rounding off the average pixel value, the average pixel value of pixels having pixel values less than 4 is 2, and the average pixel value of pixels having pixel values equal to or greater than 4 is 6. Referring to FIG. 4D, the average pixel value of pixels having pixel values less than 25 is 70÷4=17.5, and the average pixel value of pixels having pixel values equal to or greater than 25 is 82÷2=41. By rounding off the average pixel value, the average pixel value of pixels having pixel values less than 25 is 18.

It is determined whether an average differential value among average pixel values of the four pixel groups is more than a predetermined threshold (Operation 36).

Referring to FIG. 4C, when the average pixel value of pixels having pixel values less than 4 is 2, and the average pixel value of pixels having pixel values equal to or greater than 4 is 6, the average differential value is 6−2=4. When the predetermined threshold is 6, the average differential value of 4 is compared with the predetermined threshold of 6.

Referring to FIG. 4D, when the average pixel value of pixels having pixel values less than 25 is 18, and the average pixel value of pixels having pixel values equal to or greater than 25 is 41, the average differential value is 41−18=23. When the predetermined threshold is 6, the average differential value of 23 is compared with the predetermined threshold of 6.

When the average differential value is more than the predetermined threshold, two pixel groups are designated as sub-blocks (Operation 38) and Operation 32 is performed. Referring to FIG. 4D, when the predetermined threshold is 6, and the average differential value is 23, since the average differential value is more than the predetermined threshold, one pixel group that includes pixels having pixel values less than 25 and the other pixel group (in the bold line) that includes pixels having pixel values equal to or greater than 25 are designated as sub-blocks which will then be sub-divided according to their respective average pixel values.

Then, Operations 32 through 36 are again repeated.

In Operation 32, two sub-blocks are designated as two pixel groups based on average pixel values of the two sub-blocks.

FIG. 4E is a diagram illustrating a sub-block having pixel values less than 25 that is divided into two pixel groups based on a average pixel value of the sub-block. Referring to FIG. 4E, since the average pixel value of the sub-block having pixel values less than 25 is 18, pixels having pixel values equal to or greater than 18 are designated as one pixel group (in the bold line), and pixels having pixel values less than 18 are designated as another pixel group.

FIG. 4F is a diagram illustrating a sub-block having pixel values equal to or greater than 25 that is divided into two pixel groups based on an average pixel value of the sub-block. Referring to FIG. 4F, since the average pixel value of the sub-block having pixel values equal to or greater than 25 is 41, pixels having pixel values equal to or greater than 41 are designated as one pixel group (in the bold line), and pixels having pixel values less than 41 are designated as another pixel group.

Average pixel values of the four pixel groups are calculated (Operation 34).

Referring to FIG. 4E, the average pixel value of pixels having pixel values less than 18 is 30÷2=15, and the average pixel value of pixels having pixel values equal to or greater than 18 is 40÷2=20. Referring to FIG. 4F, the pixel value of a pixel having a pixel value less than 41 is 40, and the pixel value of a pixel having a pixel value equal to or greater than 41 is 42.

It is determined whether an average differential value among average pixel values of the four pixel groups is more than a predetermined threshold (Operation 36).

Referring to FIG. 4E, when the average pixel value of pixels having pixel values less than 18 is 15, and the average pixel value of pixels having pixel values equal to or greater than 18 is 20, the average differential value is 20−15=5. When the predetermined threshold is 6, the average differential value of 5 is compared with the predetermined threshold of 6.

Referring to FIG. 4F, when the average pixel value of pixels having pixel values less than 41 is 40, and the average pixel value of pixels having pixel values equal to or greater than 41 is 42, the average differential value is 42−40=2. When the predetermined threshold is 6, the average differential value of 2 is compared with the predetermined threshold of 6.

When the average differential value is less than the predetermined threshold, a representative pixel value that represents pixel values of blocks or sub-blocks is determined (Operation 40). An average of values of pixels of blocks or sub-blocks is determined as the representative pixel value.

Referring to FIG. 4C, when the average differential value of two pixel groups is 4, and the predetermined threshold is 6, since the average differential value of two pixel groups of 4 is less than the predetermined threshold of 6, the representative pixel value that represents the sub-block of FIG. 4C is determined. The representative pixel value is 40÷10=4, which is obtained by dividing a summed value of pixel values of the sub-block by the number of pixels of the sub-block.

Referring to FIG. 4E, when the average differential value of two pixel groups is 5, and the predetermined threshold is 6, since the average differential value of two pixel groups of 5 is less than the predetermined threshold of 6, the representative pixel value that represents the sub-block of FIG. 4E is determined. The representative pixel value is 70÷4=17.5, which is obtained by dividing a summed value of pixel values of the sub-block by the number of pixels of the sub-block. Since the representative pixel value should be an integer number, the representative pixel value is rounded off to 18.

Referring to FIG. 4F, when the average differential value of two pixel groups is 2, and the predetermined threshold is 6, since the average differential value of two pixel groups of 2 is less than the predetermined threshold of 6, the representative pixel value that represents the sub-block of FIG. 4F is determined. The representative pixel value is 82÷2=41, which is obtained by dividing a summed value of pixel values of the sub-block by the number of pixels of the sub-block.

Map information of each pixel of sub-blocks having the representative pixel value is created (Operation 42). Sub-blocks having the representative pixel value have the same map information.

FIGS. 5A through 5C are diagrams illustrating map information of sub-blocks. FIG. 5A illustrates an example of map information of the sub-block having a representative pixel value shown in FIG. 4C. The created map information of pixels of the sub-block having the representative pixel value is the same for all the pixels of that particular sub-block. FIG. 5A illustrates map information "0".

FIG. 5B illustrates an example of map information of the sub-block having the representative pixel value shown in FIG. 4E. The same map information on pixels of the sub-block having the representative pixel value shown in FIG. 4E is created in addition to map information created in FIG. 5A. FIG. 5B illustrates map information "1".

FIG. 5C illustrates an example of map information of the sub-block having a representative pixel value shown in FIG. 4F. The same map information on pixels of the sub-block having the representative pixel value shown in FIG. 4F is created in addition to map information created in FIGS. 5A and 5B. FIG. 5C illustrates map information "2".

It is determined whether a block of 4×4 is completely divided into sub-blocks (Operation 44). Whether the block of 4×4 is completely divided into sub-blocks can be determined by whether a representative pixel value of pixels of the block of 4×4 is completely determined.

If the block of 4×4 is not completely divided into sub-blocks, Operation 32 is performed. However, if the block of 4×4 is completely divided into sub-blocks, a mode of the block of 4×4 is determined to create a bit stream according to the number of sub-blocks (Operation 46). The type of mode is determined in advance within the range of the greatest number of sub-blocks divided from the block of 4×4. For example, the greatest number of sub-blocks divided from the block of 4×4 is 16. Thus, the types of mode determined in advance in the block of 4×4 are 16. If the block of 4×4 is not divided into sub-blocks and has an average pixel value, 0, this is classified as one type of mode.

Types of modes used to create the bit stream are shown in Table 1.

TABLE 1

| Type of Modes | Number of Mode Bits | Number of Sub-blocks | Number of Map Bits | Entire Bit Volume [bit] |
|---|---|---|---|---|
| 0 | 3 | 0 | 0 | 3 + 0 × 9 + 0 × 16 = 3 |
| 1 | 3 | 1 | 0 | 3 + 1 × 9 + 0 × 16 = 12 |
| 2 | 3 | 2 | 1 | 3 + 2 × 9 + 1 × 16 = 37 |
| 3 | 3 | 3 | 2 | 3 + 3 × 9 + 2 × 16 = 62 |
| 4 | 3 | 4 | 2 | 3 + 4 × 9 + 2 × 16 = 71 |
| 5 | 3 | 5 | 3 | 3 + 5 × 9 + 3 × 16 = 96 |
| 6 | 3 | 6 | 3 | 3 + 6 × 9 + 3 × 16 = 10 |
| 7 | 3 | 7~16 | 0 | 3 + 8 × 16 = 131 |

Table 1 shows eight types of modes from 0 through 7. Since 3 [bit] is required to express eight types of modes as a binary number, the number of mode bits is 3, as shown in Table 1.

Mode 0 corresponds to an average pixel value of 0 calculated in Operation 30 (to be more specific, a residue average value corresponding to an average value of pixels of a block spatially and temporally predicted). Mode 0 is determined when the block of 4×4 is not divided into sub-blocks. In mode 0, the number of sub-blocks is 0, since the block of 4×4 is not divided into sub-blocks although Operations 32 through 44 are performed and the average pixel value is 0. Since map information is not necessarily created in mode 0 due to there being no sub-blocks, the number of map bits is 0.

Mode 1 is determined when the block of 4×4 is not divided into sub-blocks and the average pixel value is not 0. Since the block of 4×4 is not divided into sub-blocks, mode 1 does not have a true sub-block, only the block of 4×4. Thus, the number of sub-blocks is 1. Since map information is not necessarily created in mode 1 due to there being no sub-block, the number of map bits is 0.

Mode 2 is determined when the block of 4×4 is divided into two sub-blocks. Since mode 2 has two sub-blocks, the number of sub-blocks is 2, and the number of map bits is 1 in order to create map information of 0 and 1 for each of two sub-blocks.

Mode 3 is determined when the block of 4×4 is divided into three sub-blocks. Since mode 3 has three sub-blocks, the number of sub-blocks is 3, and the number of map bits is 2 in order to create map information of 0, 1, and 2 for each of three sub-blocks.

Mode 4 is determined when the block of 4×4 is divided into four sub-blocks. Since mode 4 has four sub-blocks, the number of sub-blocks is 4, and the number of map bits is 2 in order to create map information of 0, 1, 2, and 3 for each of four sub-blocks.

Mode 5 is determined when the block of 4×4 is divided into five sub-blocks. Since mode 5 has five sub-blocks, the number of sub-blocks is 5, and the number of map bits is 3 in order to create map information of 0, 1, 2, 3, and 4 for each of the five sub-blocks.

Mode 6 is determined when the block of 4×4 is divided into six sub-blocks. Since mode 6 has six sub-blocks, the number of sub-blocks is 6, and the number of map bits is 3 in order to create map information of 0, 1, 2, 3, 4, and 5 for each of five sub-blocks.

Mode 7 is determined when the block of 4×4 is divided into seven to sixteen sub-blocks. Since it is suitable to binarize an uncompressed block in mode 7, the number of map bits is 0.

When the block of 4×4 is divided into seven to sixteen sub-blocks, there are also as many modes classified as the number of sub-blocks. In this case, since a compression efficiency is reduced, all types of modes classified according to the compression efficiency as required can be unified as mode 7.

Since the number of sub-blocks divided from the block of 4×4 shown in FIGS. 4A through 4F is 3, mode 3 is used to create the bit stream of the block of 4×4 shown in FIG. 4A.

It is determined whether a compression rate of the block is necessarily adjusted (Operation 16).

If the compression rate of the block is necessarily adjusted (Operation 18), Operation 14 is again performed. A value of a predetermined threshold is increased in order to increase the compression rate. When the value of the predetermined threshold is increased, since the block has relatively few sub-blocks, the compression rate is increased. However, increasing of the compression rate causes degradation of an image quality. Conversely, the value of the predetermined threshold is reduced in order to decrease the compression rate. When the value of the predetermined threshold is reduced, since the block has relatively many sub-blocks, the compression rate is decreased. However, decreasing of the compression rate results in maintenance of the image quality.

If the compression rate of the block is not necessarily adjusted, bit streams of a determined mode, map information, and representative pixel values are generated (Operation 20).

After first generating the bit stream of the determined mode, bit streams of map information and representative pixel values are generated.

As shown in Table 1, mode 3 is determined as the mode of the block of 4×4 shown in FIG. 4A. Thus, since the value indicating the type of mode, i.e., mode 3, is 3, 3 is binarized to create the bit stream 011.

Map information of the block shown in FIG. 4A is illustrated in FIG. 5C. Since the number of map bits of map information is 2, map information of pixels of the block has the bit stream having a bit volume of 2×16 [bit]. Each of map information 0, 1, and 2 of pixels (1) through (16) in FIG. 5C is binarized to 00, 01, and 10, respectively. Bit streams having the bit volume of 2×16 [bit] created from map information of pixels (1) through (16) are 00,00,00,01,00,01,01,10,00,00, 00,10,00,00,00,01.

Representative pixel values of sub-blocks of the block shown in FIG. 4A are 4, 18, and 41. Since the block shown in FIG. 4A has three sub-blocks, representative pixel values have the bit stream having the bit volume of 3×9 [bit]. The block having a pixel value of 8 [bit] has the pixel value of 9 [bit] due to the temporal and spatial prediction, three sub-blocks of the block having the pixel value of 9 [bit] have the bit stream having the bit volume of 3×9 [bit]. Bit streams of representative pixel values of 4, 18, and 41 of three sub-blocks are 000000100,000010010,000101001 when representative pixel values of 4, 18, and 41 are binarized.

Bit streams having the bit volume of 3+3×9+2×16=62 [bit] of the mode, map information, and representative pixel values of the block shown in FIG. 4A are 011,00,00,00,01,00,01,01, 10,00,00,00,10,00,00,00,01,000000100,000010010, 000101001.

Mode 0, which is determined when the block is not divided into sub-blocks and the average pixel value is 0, creates only the bit stream indicating the type of mode. Bit streams of map information and representative pixel values of the block in mode 0 are not created. The bit volume of the block in mode 0 is 3+0×9+0×16=3 [bit].

Mode 1, which is determined when the block is not divided into sub-blocks, does not have a sub-block, only the whole block. Thus, there is only one sub-block. The number of map bits is 0. The bit volume of the block in mode 1 is 3+1×9+0× 16=12 [bit] as shown in Table 1.

Mode 2, having two sub-blocks, requires 1 map bit. The bit volume of the block in mode 2 is 3+2×9+1×16=37[bit] as shown in Table 1.

Mode 3, having three sub-blocks, requires 2 map bits. The bit volume of the block in mode 3 is 3+3×9+2×16=62[bit] as shown in Table 1.

Mode 4, having four sub-blocks, requires 2 map bits. The bit volume of the block in mode 4 is 3+4×9+2×16=71[bit] as shown in Table 1.

Mode 5, having five sub-blocks, requires 3 map bits. The bit volume of the block in mode 5 is 3+5×9+3×16=96[bit] as shown in Table 1.

Mode 6, having six sub-blocks, requires 3 map bits. The bit volume of the block in mode 6 is 3+6×9+3×16=105[bit] as shown in Table 1.

Mode 7 is used to binarize pixel values of pixels of an uncompressed block. Thus, bit streams of pixel values of pixels of the uncompressed block having 8 bits are created, while bit streams of sub-blocks and map bits are not created. The bit volume of the block in mode 7 is 3+8×16=131[bit] as shown in Table 1.

As described above, a block is divided into sub-blocks, divided sub-blocks are classified from several modes, and bit streams are created according to the classified modes, thereby reducing degradation of the image and increasing the compression efficiency in comparison with the conventional compression method.

FIG. 6 is a flow chart illustrating an image data decoding method according to an embodiment of the present invention. The image data decoding method is used to decode bit streams of modes, map information, and representative pixel values created using the image data encoding method shown in FIG. 2.

A bit stream of a determined mode of a block is decoded (Operation 30). The value 3 is obtained by decoding 011, the bit stream of the mode of the block shown in FIG. 4A, so that it is confirmed that the block shown in FIG. 4A has mode 3. Since the number of mode bits is in advance established, 011 having 3 bits is first decoded in the bit stream of 011,00,00, 00,01,00,01,01,10,00,00,00,10,00,00,00, 01,000000100,000010010, 000101001 using the number of mode bits, 3.

Bit streams of map information of the block are then decoded (Operation 32). Map information as shown in FIG. 5C can be obtained by decoding 00,00,00,01,00,01,01,10,00, 00,00,10,00,00,00,01 corresponding to bit streams of map information of the block shown in FIG. 4A. In Operation 30, the bit stream of mode 3 of the block is created, and the number of map bits in mode 3 is 2. Thus, map information is decoded by reading sixteen 2-bit bit streams after 011 in 011,00,00,00,01,00,01,01,10,00,00,00,10,00,00,00,01, 000000100,000010010,000101001.

Bit streams of representative pixel values of the block are decoded (Operation 34). 4, 18, and 41, corresponding to representative pixel values of the sub-blocks shown in FIGS. 4C, 4E, and 4F, can be obtained by decoding 000000100, 000010010, 000101001 corresponding to bit streams of representative pixel values of the sub-blocks shown in FIGS. 4C, 4E, and 4F. In Operation 30, the bit stream of mode 3 of the block is created, and the number of sub-blocks in mode 3 is 3. Thus, representative pixel values are decoded by reading three 9-bit bit streams after 011,00,00,00,01,00,01,01,10,00, 00,00,10, 00,00,00,01 in 011,00,00,00,01,00,01,01,10,00,00, 00,10,00,00,00,01,000000100, 000010010, 000101001.

FIG. 7 illustrates the block shown in FIG. 4A having bit streams decoded by Operations 30, 32, and 34 of FIG. 6. Referring to FIG. 7, a loss-compressed image is decoded.

The RGB signal encoded in Operation 12 is decoded (Operation 36). The encoded RGB signal of the block having decoded bit streams show in FIG. 7 is decoded.

Spatially predicted pixel values of the decoded block are compensated for, or temporally predicted pixel values of the decoded block are compensated for (Operation 38).

Figure 8:
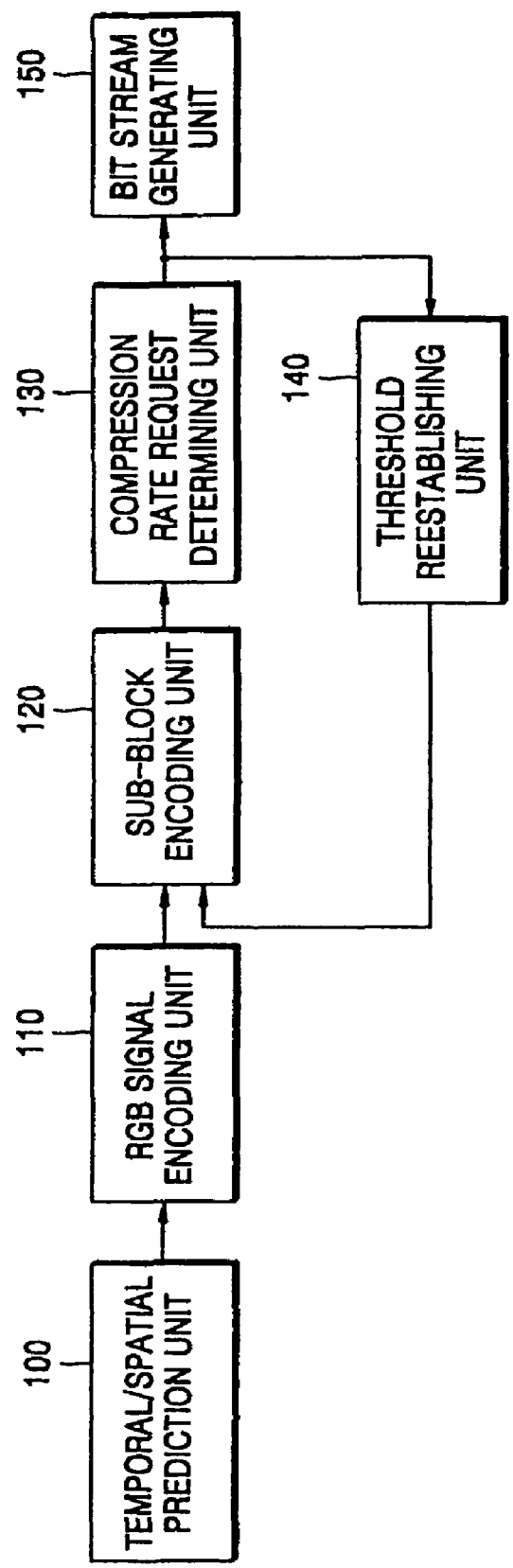
FIG. 8 is a block diagram illustrating an image data encoding apparatus according to an embodiment of the present invention.

FIG. 8 is a block diagram illustrating an image data encoding apparatus according to an embodiment of the present invention. Referring to FIG. 8, the image data encoding apparatus comprises a temporal/spatial prediction unit 100, an RGB signal encoding unit 110, a sub-block encoding unit 120, a compression rate request determining unit 130, a threshold reestablishing unit 140, and a bit stream generating unit 150.

The temporal/spatial prediction unit 100 spatially predicts pixel values of a current block using blocks spatially adjacent to the current block, or temporally predicts pixel values of the current block using a frame previous to the current block, and outputs predicted pixel values to the RGB signal encoding unit 110. The temporal/spatial prediction unit 100 spatially predicts pixel values by estimating a prediction direction from the current block of each chrominance component and blocks spatially adjacent, and temporally predicts pixel values by estimating motions between the current block and a previous block of each chrominance component.

The RGB signal encoding unit 110 encodes the RGB signal by removing redundant information in pixel values of chrominance components, R, G, and B spatially and temporally predicted in the temporal/spatial prediction unit 100, and outputs the encoded RGB signal to the sub-block encoding unit 120. The RGB signal encoding unit 110 removes redundant information using correlations of predicted pixel values of chrominance components, R, G, and B and encodes the RGB signal.

The sub-block encoding unit 120 repeats a process of dividing blocks into two sub-blocks based on an average value of pixels of the block of the encoded RGB signal, creates map information of the divided sub-blocks, and determines modes for generating bit streams according to the number of divided sub-blocks.

Figure 9:
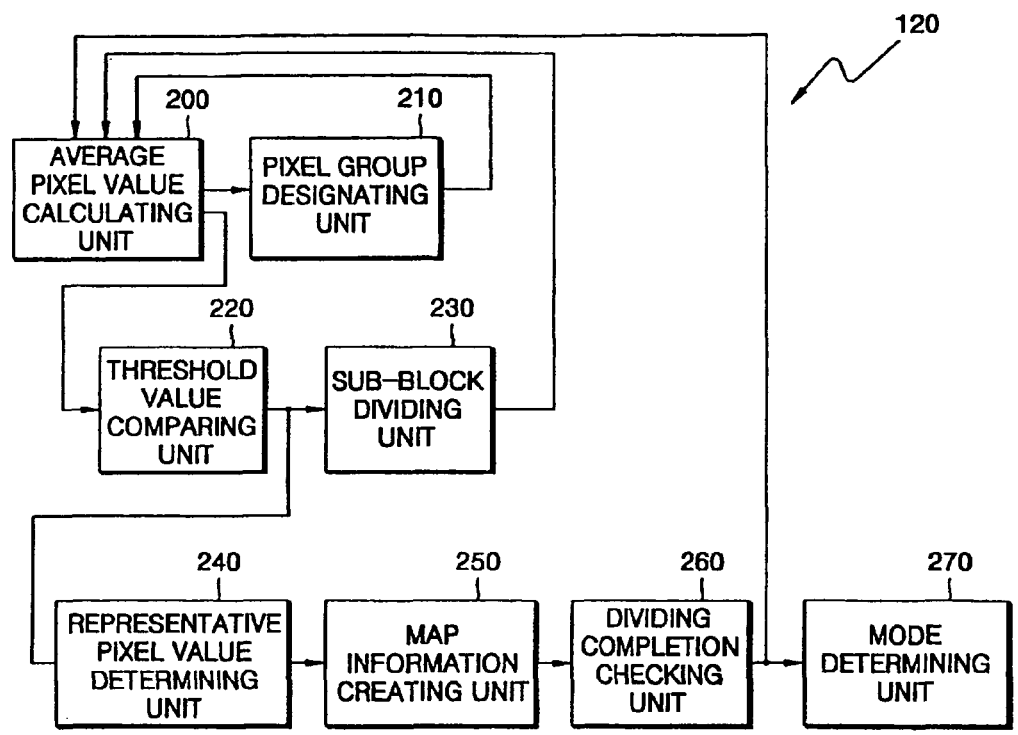
FIG. 9 is a block diagram illustrating a sub-block decoding unit shown in FIG. 8.

FIG. 9 is a block diagram illustrating the sub-block decoding unit 120 shown in FIG. 8. Referring to FIG. 9, the sub-block decoding unit 120 comprises an average pixel value calculating unit 200, a pixel group designating unit 210, a threshold value comparing unit 220, a sub-block dividing unit 230, a representative pixel value determining unit 240, a map information creating unit 250, a dividing completion checking unit 260, and a mode determining unit 270.

The average pixel value calculating unit 200 calculates average pixel values of pixels of the block and/or sub-blocks, and outputs calculated average pixel values to the pixel group designating unit 210 and the threshold value comparing unit 220. The average pixel value calculating unit 200 calculates average pixel values of pixels of sub-blocks in response to results obtained from the pixel group designating unit 210 and the sub-block dividing unit 230, or the dividing completion checking unit 260.

Average pixel values obtained by the average pixel value calculating unit 200 should be integer numbers. Average pixel values other than integer numbers should be rounded off.

The pixel group designating unit 210 designates pixels having pixel values equal to or greater than the calculated average pixel value as a pixel group, and pixels having pixel values less than the calculated average pixel value as another pixel group, and outputs the designated pixel groups to the average pixel value calculating unit 200.

The threshold value comparing unit 220 determines whether an average differential value between average pixel values of two pixel groups is more than a predetermined threshold, and outputs the determination to the sub-block dividing unit 230 and the representative pixel value determining unit 240.

When the sub-block dividing unit 230 receives a result of the average differential value that is more than the predetermined threshold from the threshold value comparing unit 220, the sub-block dividing unit 230 designates two pixel groups as sub-blocks, and outputs the designated sub-blocks to the average pixel value calculating unit 200.

When the representative pixel value determining unit 240 receives a result of the average differential value that is less than the predetermined threshold from the threshold value comparing unit 220, the representative pixel value determining unit 240 determines representative pixel values of pixels of the block or sub-blocks, and outputs the determined representative pixel values to the map information creating unit 250. The representative pixel value determining unit 240 determines average pixel values of pixels of the block or sub-blocks as representative pixel values.

The map information creating unit 250 creates map information of each pixel of sub-blocks having representative pixel values, and outputs the created map information to the dividing completion checking unit 260. Map information of the pixels of sub-blocks created by the map information creating unit 250 is the same for all the pixels of each of the respective sub-blocks.

The dividing completion checking unit 260 determines whether the block is completely divided into sub-blocks, and outputs the determination to the average pixel value calculating unit 200 and the mode determining unit 270.

When the mode determining unit 270 receives a determination that the block is completely divided into sub-blocks from the dividing completion checking unit 260, the mode determining unit 270 determines the mode of the block. Types of modes are determined in advance within the range of the greatest number of sub-blocks divided from the block. The block which is not divided into sub-blocks, and has a average pixel value of 0 is classified as one type of mode.

The compression rate request determining unit 130 determines whether the compression rate of the block is necessarily adjusted, and outputs the determination to threshold reestablishing unit 140 and the bit stream generating unit 150.

When the threshold reestablishing unit 140 receives a result of the compression rate of the block that is necessarily adjusted by the compression rate request determining unit 130, the threshold reestablishing unit 140 reestablishes a predetermined threshold, and outputs the reestablished threshold to the sub-block decoding unit 120. A value of the predetermined threshold is increased in order to increase the compression rate. The threshold reestablishing unit 140 adjusts the value of the predetermined threshold to be increased in order to increase the compression rate. The threshold reestablishing unit 140 adjusts the value of the predetermined threshold to be decreased in order to decrease the compression rate.

When the bit stream generating unit 150 receives a result of the compression rate of the block that is not necessarily adjusted from compression rate request determining unit 130, the bit stream generating unit 150 generates bit streams of the mode determined by the sub-block decoding unit 120, map information, and representative pixel values. The bit stream generating unit 150 generates bit streams of determined modes before generating bit streams of map information and representative pixel values.

When the block is not divided into sub-blocks, and has an average pixel value of 0, the bit stream generating unit 150 generates the bit stream of the determined mode, while not generating bit streams of map information and representative pixel values.

Figure 10:
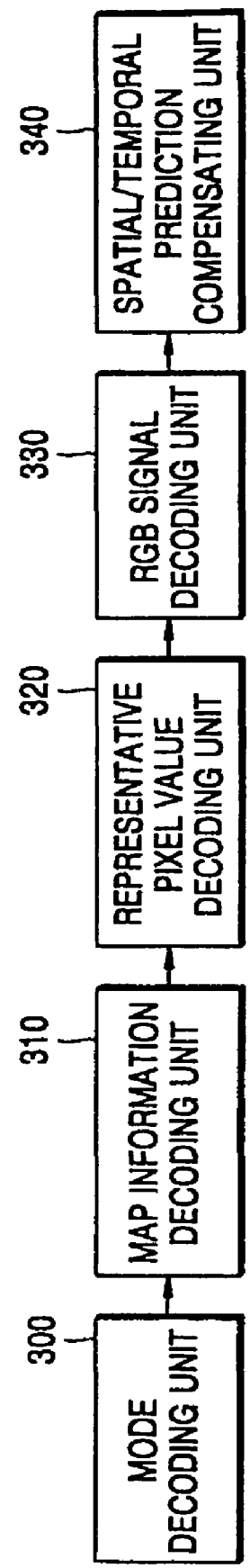
FIG. 10 is a block diagram illustrating an image data decoding apparatus according to an embodiment of the present invention.

FIG. 10 is a block diagram illustrating an image data decoding apparatus according to an embodiment of the present invention. The image data decoding apparatus comprises a mode decoding unit 300, a map information decoding unit 310, a representative pixel value decoding unit 320, an RGB signal decoding unit 330, and a spatial/temporal prediction compensating unit 340.

The mode decoding unit 300 decodes bit streams of modes created by the image data encoding apparatus, and outputs decoded bit streams to the map information decoding unit 310. The mode decoding unit 300 decodes bit streams by the number of bit streams in advance defined among bit streams generated by the image data encoding apparatus.

The map information decoding unit 310 decodes bit streams of map information created by the image data encoding apparatus, and outputs decoded bit streams to the representative pixel value decoding unit 320.

The representative pixel value decoding unit 320 decodes bit streams of representative pixel values created by the image data encoding apparatus, and outputs decoded bit streams to the RGB signal decoding unit 330.

The RGB signal decoding unit 330 decodes the RGB signal decoded by the representative pixel value decoding unit 320 and outputs the decoded RGB signal to the spatial/temporal prediction compensating unit 340.

When the spatial/temporal prediction compensating unit 340 receives the decoded RGB signal from the RGB signal decoding unit 330, the spatial/temporal prediction compensating unit 340 compensates for spatially predicted pixel values of the decoded block, or temporally predicted pixel values of the decoded block.

As described above, the method and apparatus for encoding and decoding image data can increase the compression rate while not degrading the image visibly.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image data encoding method comprising:
   repeating a process of dividing a block into sub-blocks based on an average value of pixels of the sub-blocks;
   creating map information of the sub-blocks;
   determining a mode for generating bit streams according to a number of the sub-blocks; and
   generating bit streams of the determined mode, map information, and representative pixel values of the block or the sub-blocks.

2. The image data encoding method of claim 1, wherein the repeating the process of dividing the block into sub-blocks comprises:
   calculating the average value of pixels of the block;
   designating pixels having pixel values equal to or greater than the calculated average pixel value as a pixel group, and pixels having pixel values less than the calculated average pixel value as another pixel group;
   calculating average pixel values of each of the two pixel groups;
   determining whether an average differential value between the average pixel values of the two pixel groups is more than a predetermined threshold;
   designating the two pixel groups as sub-blocks, and repeating the designating of the two pixel groups for each of the sub-blocks in response to the average differential value being more than the predetermined threshold;
   determining representative pixel values in response to the average differential value being less than the predetermined threshold;
   creating map information of each pixel of the sub-blocks having representative pixel values;
   determining whether the block is completely divided into the sub-blocks, and repeating the designating the two pixel groups into the sub-blocks in response to the block not being completely divided into the sub-blocks; and
   determining the mode for generating the bit streams in response to the block being completely divided into the sub-blocks.

3. The image data encoding method of claim 2, wherein the determining the representative pixel values comprises determining the average pixel values of pixels of the block or the sub-blocks as representative pixel values.

4. The image data encoding method of claim 3, wherein the creating map information comprises creating identical map information for each pixel of the respective sub-blocks.

5. The image data encoding method of claim 2, further comprising:
   determining whether a compression rate of the block is necessarily adjusted before generating the bit streams; and
   reestablishing the predetermined threshold, and repeating the process of dividing the block into sub-blocks, creating the map information, and determining the mode, in response to the compression rate being necessarily adjusted.

6. The image data encoding method of claim 1, comprising:
   determining a type of the mode in advance within a range of a greatest number of the sub-blocks divided from the block.

7. The image data encoding method of claim 1, wherein the generating the bit streams comprises generating the bit stream of the determined mode before generating the bit streams of the map information and representative pixel values.

8. The image data encoding method of claim 1, further comprising:
   spatially predicting pixel values of a current block using blocks spatially adjacent to the current block, or temporally predicting pixel values of the current block using a frame previous to the current block, and then beginning the process of dividing the block into the sub-blocks.

9. The image data encoding method of claim 8, wherein the generating the bit streams comprises generating the bit stream of the determined mode while not generating bit streams of the map information and representative pixel values in response to the block not being divided into the sub-blocks and having a residue average value of 0, the average pixel value obtained being the residue average value.

10. The image data encoding method of claim 8, further comprising:
    encoding an RGB signal by removing redundant information in pixel values of spatially and temporally predicted chrominance components, R, G, and B.

11. An image data encoding apparatus comprising:
    a sub-block encoding unit to repeat a process of dividing a block into sub-blocks based on an average value of pixels of the sub-blocks, create map information of the sub-blocks, and determine a mode for generating bit streams according to a number of the sub-blocks; and
    a bit stream generating unit to generate bit streams of the determined mode, map information, and representative pixel values of the block or sub-blocks.

12. The image data encoding apparatus of claim 11, wherein the sub-block encoding unit comprises:
    an average pixel value calculating unit to calculate the average pixel values of pixels of the block or sub-blocks;
    a pixel group designating unit to designate pixels having pixel values equal to or greater than the calculated average pixel value as a pixel group, and pixels having pixel values less than the calculated average pixel value as another pixel group;
    a threshold value comparing unit to determine whether an average differential value between average pixel values of the two pixel groups is more than a predetermined threshold;
    a sub-block dividing unit to designate the two pixel groups as sub-blocks in response to a determination that the average differential value is more than the predetermined threshold;
    a representative pixel value determining unit to determine representative pixel values of pixels of the block or sub-blocks in response to a determination that the average differential value is less than the predetermined threshold;
    a map information creating unit to create the map information of each pixel of the sub-blocks having representative pixel values;
    a dividing completion checking unit to determine whether the block is completely divided into the sub-blocks; and a mode determining unit to determine the mode of the block in response to the dividing completion checking unit determining that the block is completely divided into the sub-blocks.

13. The image data encoding apparatus of claim 12, wherein the representative pixel value determining unit determines the average pixel values of pixels of the block or sub-blocks as representative pixel values.

14. The image data encoding apparatus of claim 13, wherein the map information creating unit creates the identical map information for each pixel of the respective sub-blocks.

15. The image data encoding apparatus of claim 12, further comprising:
a compression rate request determining unit to determine whether a compression rate of the block is necessarily adjusted; and
a threshold reestablishing unit to reestablish the predetermined threshold in response to the compression rate of the block being necessarily adjusted.

16. The image data encoding apparatus of claim 11, further comprising:
a mode determining unit to determine a type of the mode in advance within a range of a greatest number of the sub-blocks divided from the block.

17. The image data encoding apparatus of claim 11, wherein the bit stream generating unit generates the bit stream of the determined mode before generating the bit streams of the map information and representative pixel values.

18. The image data encoding apparatus of claim 11, further comprising:
a temporal/spatial prediction unit to spatially predict pixel values of a current block using blocks spatially adjacent to the current block, or temporally predict pixel values of the current block using a frame previous to the current block.

19. The image data encoding apparatus of claim 18, wherein the bit stream generating unit generates the bit stream of the determined mode while not generating bit streams of the map information and representative pixel values in response to the block not being divided into the sub-blocks and having a residue average value 0, the average pixel value obtained by the sub-block encoding unit of pixels predicted by the temporal/spatial prediction unit being the residue average value.

20. The image data encoding apparatus of claim 19, further comprising:
an RGB signal encoding unit to encode an RGB signal by removing redundant information in pixel values of chrominance components, R, G, and B spatially and temporally predicted in the temporal/spatial prediction unit.

21. At least one non-transitory computer readable medium storing instructions that control at least one processor to perform a method of encoding image data, the method comprising:
repeating a process of dividing a block into sub-blocks based on an average value of pixels of the sub-blocks;
creating map information of the sub-blocks;
determining a mode for generating bit streams according to a number of the sub-blocks; and
generating bit streams of the determined mode, map information, and representative pixel values of the block or the sub-blocks.

22. An image data encoding method comprising:
repeatedly dividing a block according to an average value of pixels of resulting sub-blocks; and
generating bit streams of information regarding the pixels according to a number of the resulting sub-blocks.

23. The method of claim 22, wherein the information comprises map information of the sub-blocks and representative pixel values of the sub-blocks.

24. The method of claim 22, wherein the information comprises a mode type of a mode for generating the bit streams of information.

25. The method of claim 24, wherein the mode type is based on a total number of the sub-blocks and a number of map bits for map information of the sub-blocks.

26. The method of claim 24, wherein the mode type is reflected in a predetermined number of bits at a beginning of the bit streams.

27. The method of claim 22, wherein the repeatedly dividing the block comprises:
designating two groups of pixels for each of the sub-blocks according to a comparison between the respective pixels and the average value of the pixels of the respective sub-blocks; and
continuing to divide the respective sub-blocks and designate the two groups for each of the sub-blocks until a difference in the average value of pixels of the two groups is within a predetermined range for each of the respective sub-blocks.

* * * * *

UNITED STATES PATENT AND TRADEMARK OFFICE
CERTIFICATE OF CORRECTION

PATENT NO. : 8,326,065 B2
APPLICATION NO. : 12/926687
DATED : December 4, 2012
INVENTOR(S) : Wooshik Kim It is certified that error appears in the above-identified patent and that said Letters Patent is hereby corrected as shown below:

Title Page Col. 1, insert items (62) and (30)
        --Related U.S. Application Data
(62)    Division of application No. 11/268,645, filed on Nov. 8, 2005, now Pat. No. 7,865,027

(30)    Foreign Application Priority Data

Nov. 9, 2004 (KR) ....................... 10-2004-0090893--.

Signed and Sealed this
Twenty-ninth Day of October, 2013

Teresa Stanek Rea
*Deputy Director of the United States Patent and Trademark Office*